United States Patent
Shatz

(10) Patent No.: US 8,918,608 B2
(45) Date of Patent: Dec. 23, 2014

(54) TECHNIQUES FOR HANDLING MEMORY ACCESSES BY PROCESSOR-INDEPENDENT EXECUTABLE CODE IN A MULTI-PROCESSOR ENVIRONMENT

(75) Inventor: Leonid Shatz, Ra'anana (IL)

(73) Assignee: Ravello Systems Ltd., Ra'anana (IL)

( * ) Notice: Subject to any disclaimer, the term of this patent is extended or adjusted under 35 U.S.C. 154(b) by 128 days.

(21) Appl. No.: 13/483,633

(22) Filed: May 30, 2012

(65) Prior Publication Data

US 2013/0179651 A1 Jul. 11, 2013

Related U.S. Application Data

(60) Provisional application No. 61/584,590, filed on Jan. 9, 2012.

(51) Int. Cl.
*G06F 9/455* (2006.01)

(52) U.S. Cl.
USPC .................................. 711/162; 711/E12.103

(58) Field of Classification Search
USPC ..................................................... 711/1–200
See application file for complete search history.

(56) References Cited

U.S. PATENT DOCUMENTS

| | | | |
|---|---|---|---|
| 4,240,139 A | 12/1980 | Fukuda et al. | |
| 4,434,459 A | 2/1984 | Holland et al. | |
| 6,829,761 B1* | 12/2004 | Sexton et al. | 717/165 |
| 2008/0201562 A1 | 8/2008 | Nishii | |
| 2008/0209189 A1 | 8/2008 | Yamazaki | |
| 2010/0161950 A1* | 6/2010 | Caprioli et al. | 712/234 |
| 2011/0040954 A1 | 2/2011 | Nishii | |

* cited by examiner

*Primary Examiner* — Mardochee Chery
*Assistant Examiner* — Zubair Ahmed
(74) *Attorney, Agent, or Firm* — M&B IP Analysts, LLC

(57) ABSTRACT

In a computing system where a plurality of processing units may execute a shared code independently, it is necessary to address data issues related to execution of the shared code and separate data. According to various embodiments disclosed herein, the per-processing unit data can be efficiently addressed in a program counter relative mode where data is accessed using a data offset value for each processing unit when the data blocks are positioned at spaces of a predetermined offset value. Further, the per-processing unit of common code in different virtual addresses is mapped to a common physical address. As a result, while each of the processing units access the exact same instruction code in physical memory it accesses a different area in memory for manipulation of data.

16 Claims, 3 Drawing Sheets

TECHNIQUES FOR HANDLING MEMORY ACCESSES BY PROCESSOR-INDEPENDENT EXECUTABLE CODE IN A MULTI-PROCESSOR ENVIRONMENT

CROSS-REFERENCE TO RELATED APPLICATIONS

This application claims the benefit of U.S. provisional application No. 61/584,590 filed Jan. 9, 2012, the contents of which are incorporated herein by reference.

TECHNICAL FIELD

The invention generally relates to virtual machines (VMs), and more specifically to execution of a guest in a para-virtualized environment and further for execution of operating systems on architectures with virtual memory and instruction sets with program-counter (PC) relative addressing.

BACKGROUND

There are many cases where it is necessary to execute the exact same executable code on a plurality of processors and provide fast memory access to data on a per-processor basis. According to prior art techniques, the executable code is copied for each processing unit instance into physical memory in a different location and executed therefrom, with further allocation for respective per-processor data memory. In cache based systems, the repeated copying or instancing of the same instructions into different areas of the memory results in waste and often thrashing of the cache content, thereby lowering performance or requiring larger memories.

In the Intel® IA-32e and Advanced Micro Devices® (AMD) 64-bit processors' architecture, the legacy GS register (which is used for segmentation addressing in 32-bit mode) is retained in vestigial form for use as an extra base pointer to operating system structures in 64-bit addressing space. The fast access to per-processor structure is possible with the use of the new kernel GS register and a "swapgs" instruction. This allows to somewhat overcome the problems discussed above with regard to the copying of the code. However, if GS and/or kernel GS registers are in use by a guest operating system of a virtual machine (VM), these registers cannot be used by the hypervisor's code to access the per-processor structures of the hypervisor itself.

A guest operating system (or simply guest) is an operating system that is installed on a virtual machine in addition to the host (main) operating system running on the hardware system. A guest is controlled by a hypervisor. The hypervisor presents to the guest a virtual operating platform and manages the execution of the guest. Multiple instances of operating systems may share the virtualized hardware resources. In full virtualization architecture, the hypervisor sufficiently simulates the hardware on which the guest executes, such that no modification is required to the guest. Another virtualized environment is para-virtualization in which a software interface is used to allow the handling and modifying of the guest.

Regardless of the virtualization environment, or otherwise, current solutions for support execution of the same portions of code by multiple processors requires either copying of the code, or does not allow sharing of the GS registers.

It would be therefore advantageous to provide a solution that overcomes the deficiencies of the prior art.

SUMMARY

Certain embodiments disclosed herein include an apparatus configured to allow execution of a single physical copy of at least a portion of code by at least two processing units. The apparatus comprises a plurality of processing units including at least a first processing unit and a second processing unit; an instruction memory connected to the first processing unit and the second processing unit via a virtual address mapping, the instruction memory storing a single copy of the at least portion of code to be executed by the first processing unit and the second processing unit, wherein the at least portion of code to be executed has a first virtual address starting point for the first processing unit and a second virtual address starting point for the second processing unit, such that a span difference that is equal to a predetermined offset value times a factor value is maintained; and a data memory accessible by the plurality of processing units via the virtual address mapping, wherein the data memory stores at least a first data block to be used by the first processing unit and having a third virtual address starting point, and a second data block to be used by the second processing unit and having a fourth virtual address starting point, such that the span difference between the third virtual address starting point and the fourth virtual address starting point is maintained; wherein at least a data access by the at least a portion of code to any of the first data block and the second data block is performed as a program counter relative memory access mode combined with a data offset, thereby allowing a single instantiation of the single physical copy of the at least portion of code by at least the first processing unit and the second processing unit while maintaining separate data block accesses.

Certain embodiments disclosed herein also include a method for executing a single physical copy of at least a portion of code executed independently by a first processing unit and a second processing unit. The method comprises determining an offset value that is at least equal to a size of the at least portion of code; generating memory mappings of the at least portion of code having different virtual addresses for the first processing unit and the second processing unit set apart by the offset value to a single physical copy of the at least portion of code; and generating memory mappings of at least portions of data blocks respective of the first processing unit and the second processing unit, wherein the memory mappings are set apart by the offset value, wherein each of the first processing unit and the second processing unit uses its respective program counter value plus the offset value to access its data blocks mapped by the memory mappings.

Certain embodiments disclosed herein also include a processing unit that comprises a processing element; an instruction memory connected to the processing element, the instruction memory stores at least a portion of code to be executed by the processing element and at least a processing element of another processing unit, the at least portion of code having the same physical address for the processing unit and at least another processing unit, wherein the processing unit and the at least another processing unit have respective virtual addresses for the at least a portion of code that map to the same physical address and are set apart at a predetermined offset value; an interface to a data memory, the data memory accessible by the processing unit and the at least another processing unit, each processing unit having virtual memory addresses of at least a portion of data being set apart by the offset value and are mapped to mutually exclusive physical data blocks, wherein a data access of the at least portion of code to data blocks is performed as a program counter relative to access combined with a data offset value.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
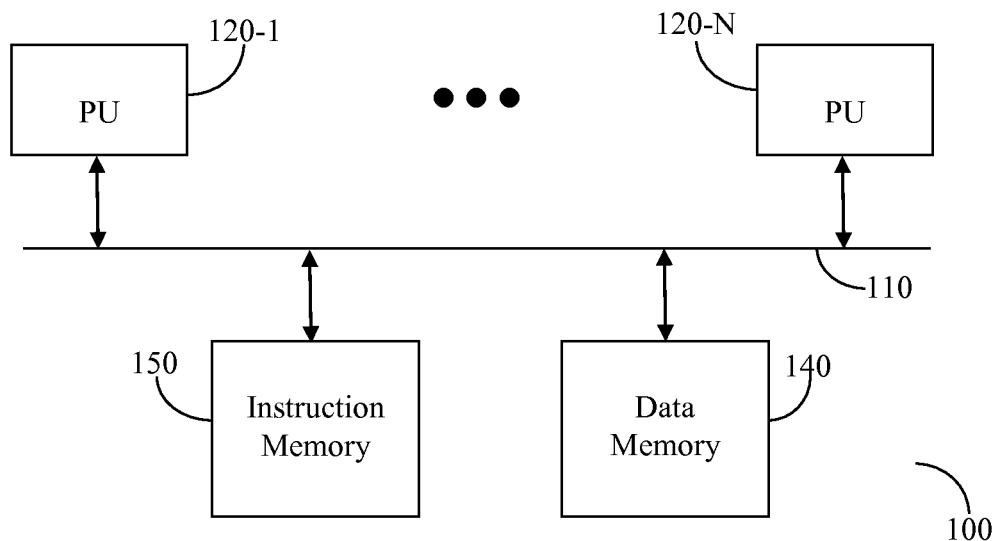
FIG. 1 is a schematic diagram of a system having a plurality of processing units that execute the same code from an instruction memory.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In a system where a plurality of processing units may execute a shared code independently, it is necessary to address data related issues. According to various embodiments disclosed herein, the per-processing unit data can be efficiently addressed in a program counter (PC) relative (PCR) mode where data is accessed using a common offset value for each processor. As a result, while each of the processing units access the exact same instruction code in physical memory, the processor accesses a different area in memory for manipulation of data.

FIG. 1 depicts a system 100 comprising a plurality of processing units (PUs) 120-1 through 120-N connected by a communication bus 110. The communication bus 110 may include, but is not limited to, a serial communication line, a data bus, a network, and any combination thereof. The network may be, but is not limited to, a local area network (LAN), wide area network (WAN), metro area network (MAN), the Internet, the worldwide web (WWW), whether wired or wireless, and any combination thereof. Each of the PU 120-1 through 120-N may be, but is not limited to, a CPU, a controller, a microcontroller, a multi-core processor, a core of a multi-core processor, and the like as well as instantiations of same in a virtual environment.

To the communication bus 110 there is connected a memory that may be partitioned virtually or physically to an instruction memory 130 and a data memory 140. The instruction memory 130 contains at least a group of a plurality of instructions that begin at a known address and that are to be accessed by at least two of the plurality of PUs 120. Typically, the system 100 comprises logical and physical addresses to access the physical memories 130 and 140.

In a non-limiting embodiment, the system 100 can operate in a para-virtualized or full-virtualized mode where the execution of a plurality of guests, a hypervisor, and a host over the PUs units are allowed. As mentioned above, when a VM of a guest uses the GS and/or kernel GS registers, these registers cannot be used by the hypervisor's code to access the per-PU structures of the hypervisor itself. Then, to execute the exact same executable code by, for example, two guests, two hosts, or one guest and one host executing on a plurality of PUs, the GS registers cannot be utilized to provide fast access to the per-PU structures.

According to the certain embodiments disclosed herein to resolve this problem, all instances of the code are mapped, for example by a memory mapper of the host, to the same physical address of the physical instruction memory 150 of the system. In this way, it is assured that there is only a single copy of the instructions to be executed. In addition, but not by way of limitation, it further allows avoidance of cache overloading for certain types of cache implementations when used in conjunction with either the instruction memory 150 or the data memory 140, such as physically indexed cache and physically tagged (PIPT) cache. It should be noted that while the data memory 140 and the instruction memory 130 are shown as separate memories, it is possible to have them in the same physical memory but in different address spaces.

Figure 2:
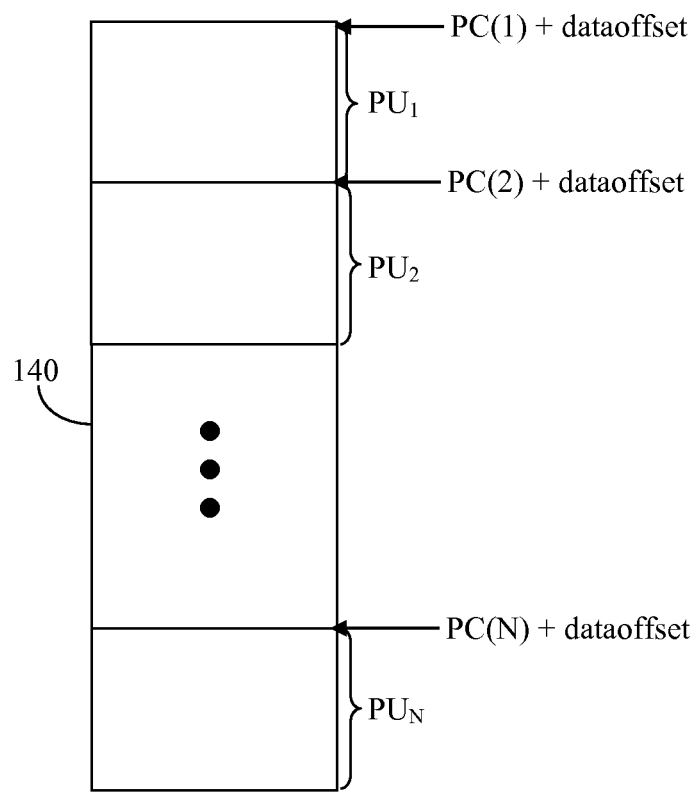
FIG. 2 is a schematic diagram of the data memory according to an embodiment of the invention.

All accesses to data in the data memory 140 by the code in the instruction memory 150 are performed as a PCR access with an offset value. The offset value is large enough to move outside of the memory page boundaries of the code and is different for each instance executing on a PU 120. In an embodiment, a calculation of a data address may be performed as follows:

$$\text{data\_address}(m) = [PC(m)] + \text{dataoffset}$$

where virtual memory mappings may be created such that:

$$PC(m) = PC(1) + \text{pcoffset} * (m-1)$$

and virtual memory address of per-PU data block, i.e., the address for each data block made available to each PU, is calculated for each PU-m as $$\text{data\_block}(m) = \text{data\_block}(1) + \text{pcoffset} * (m-1)$$

where m is an integer having values 1, 2, ... N and N is the maximum number of processing units (PUs) in the system, and PC(m) is the PC of a respective PU(m). The value of pcroffset must be larger than the difference between the first instruction's address that accesses data and the last instruction address that accesses data for the same code portion. The value of dataoffset determines the location of a specific data item within a data block pointed to by [PC(m)]. Typically, this is rounded up to a memory management unit (MMU) page size integer multiplier. For example, if the code spans an address space of H'FFFF then the offset value can be H'10000, which ensures that the data for each PU 120 will be at a separate location in memory while the same code is used. The basic memory map for the data portion is shown in FIG. 2.

The data offset is set for each code instruction as a difference between the program counter and the data object in a data memory block associated with a first processing unit, e.g., PU 120-1. This is achieved by the virtual memory mappings as discussed hereinabove. It should be understood that according to an embodiment disclosed herein, all PUs 120 have the same data offset. Furthermore, the associated per-PU 120 data blocks are set apart from each other by the same offset as instruction code blocks for each PU 120. With the memory mappings defined as described hereinabove, each one of the PUs 120 can access its per-PU 120 data block using a single physical copy of the instruction code. This holds true for every code instruction instance having access to per-PU data according to the principles of this invention. It should be understood that data offsets may vary from one instruction instance to another. However, once determined, the data offsets shall remain equal for all PUs 120 relative to the PCR addressing mode.

Figure 3:
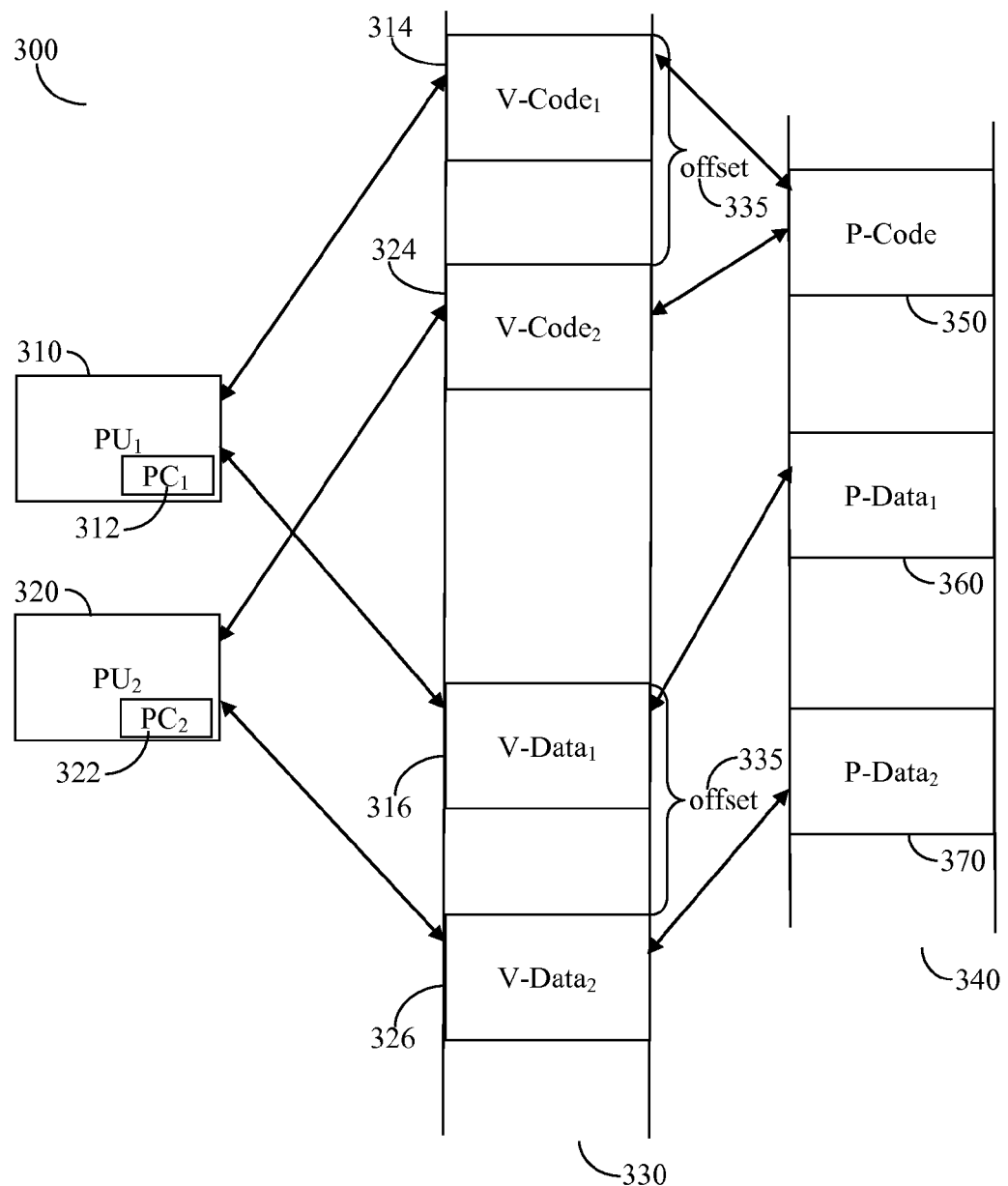
FIG. 3 is a diagram showing a single physical copy of executable code used with respect to two processors while separate data memory portions are used for the same code according to one embodiment.

An exemplary and non-limiting schematic diagram 300 of the disclosed solution with respect to memory access is shown in FIG. 3. Two PUs 310 and 320 are shown each having a respective program counter 312 and 322, the program counters used for the PCR address access as explained above and herein. Each of the PUs 310 and 320 accesses, at least in part, the same code portion 350 in a physical memory 340. Using a memory management scheme, the physical code (P-Code) 350 is mapped for each of the PUs 310 and 320, to two different virtual codes (V-codes) 314 and 324 in a virtual memory 330, and at a predefined offset 335, as explained in more detail hereinabove. Specifically, the code is stored in the memory area 350 of the physical memory 340, which is equivalent to the physical memory 150 of FIG. 1, and the data is stored in areas 360 and 370 of physical memory 340, which is equivalent to the physical memory 140 of FIG. 1, when the memories 140 and 150 are in the same memory. In this way, each of the PUs 310 and 320 by means of their respective program counters 312 and 322 access the same P-Code 350 through mapping of the respective V-codes 314 and 324. This ensures that a single copy or instance of the common portion of code is used in the physical memory 340.

Using the mapping scheme discussed hereinabove, the PUs 310 and 320 access physical data areas 360 and 370 of the physical data memory 340. Such access is performed using a data PCR addressing which is performed through the respective virtual data (V-data) portions 316 and 326, placed at a distance which is the same as predefined offset value 335. Hence, by using the solution discussed hereinabove, the same code may be used a plurality of times without having multiple copies thereof, while the data portions remain separate, and accessible by the respective PU. While the description herein is with respect of two PUs and respective instruction and data blocks, this should not be viewed as limiting the scope of the invention and rather should be understood as an exemplary embodiment thereto.

Figure 4:
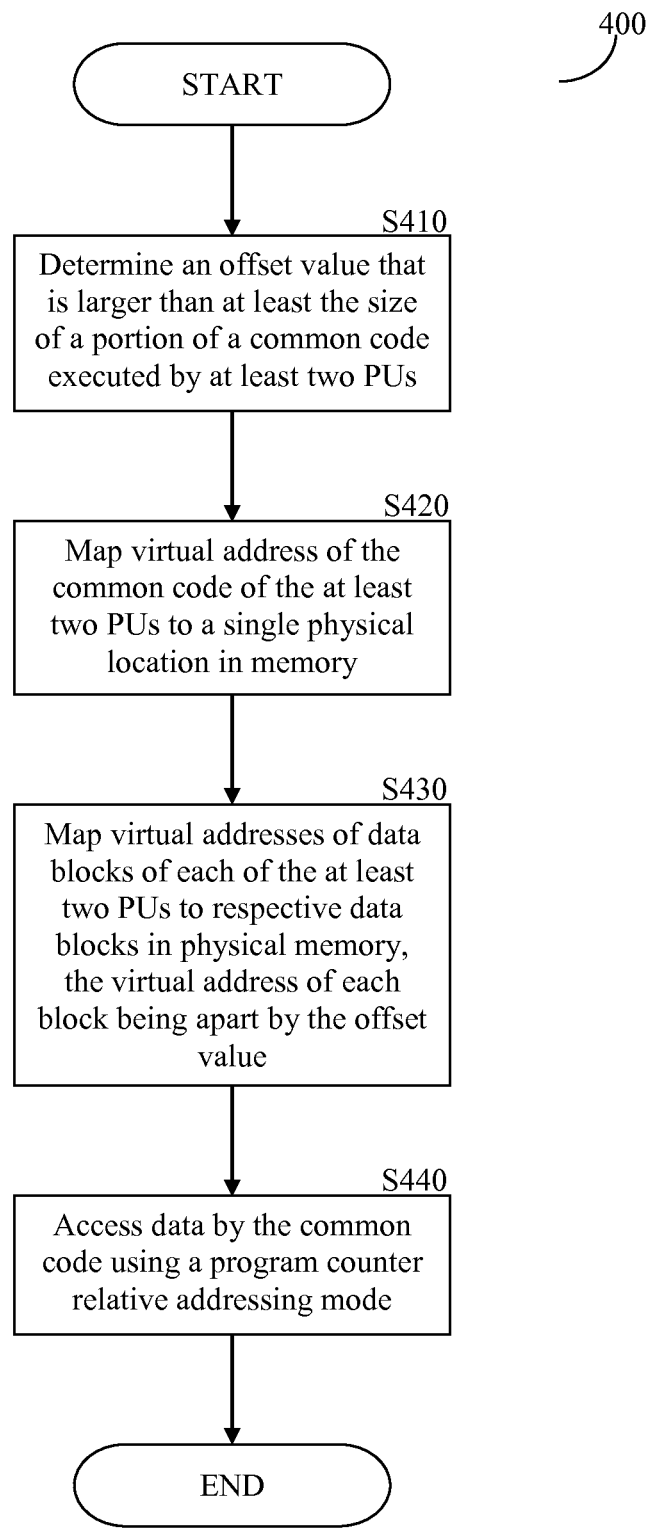
FIG. 4 is a flowchart illustrating a method for executing a single physical copy of a portion of independently executable code by at least two PUs during the access of different data blocks by each PU according to one embodiment.

FIG. 4 shows an exemplary and non-limiting flowchart 400 illustrating a method for executing a single physical copy of a portion of code executed independently by at least two PUs while accessing at least two different data blocks one for each PU. The method is performed by at least one of a host operating system or a hypervisor. The method is typically performed when preparing a portion of code to be executed in the described environment and thereafter as access to the physical memory is performed according to the method.

At S410, an offset value that is larger than or equal to the length of the portion of the executable code is determined. At S420, the different virtual addresses of a portion of common code, to be executed by each PU, are mapped to a single physical address. The virtual addresses allocated for each PU are set apart from each other by the offset value determined at S410.

At S430, the address spaces in the virtual memory of data blocks respective of each PU that needs to execute the portion of common code are mapped to physical addresses. The virtual addresses are set apart by the offset value. The data blocks may be used by the PUs to execute the portion of common code to store and retrieve data therein that is different for each PU and therefore cannot be shared.

At S440, during execution of the portion of the common code independently by each PU executing the common code. Each such PU accesses the same copy of the portion of common code in the physical memory through the mappings of the respective virtual address. Access to data blocks by each PU executing the portion of common code is performed using a PCR addressing respective of the virtual addresses of the data and the computed offset, as explained hereinabove in greater detail.

The embodiments disclosed may be used in virtual machines (VMs), and more specifically to execution of a guest in a para-virtualized environment, and can be also useful for an operating system running on architectures with virtual memory and instruction sets with PCR addressing. It should be further noted that this solution may be used exclusively for addressing all data and instruction portions, however, this is not required and it can be used in conjunction with other methods of data and instruction access such that a portion of the data and instructions are accessed in a PCR mode as explained hereinabove, and other portions are accessed differently.

A person of ordinary skill in the art would readily realize that both physical and virtual instantiations may benefit from the teachings disclosed herein. Hence, processing units may be both physical devices and virtual devices executing on other virtual or physical devices at an as deep as required hierarchy. Similarly, the memories may be virtually mapped to physical memories directly, and virtual memories may be mapped to other virtual memories that are then mapped to physical memories in an as deep as required hierarchy. All such embodiments should be considered an integral part of the invention.

The embodiments disclosed herein may be implemented as hardware, firmware, software, or any combination thereof. Moreover, the software is preferably implemented as a program, for example as a part of system program such as, and without limitations, an operating system or hypervisor, tangibly embodied on a program storage unit or tangible computer readable medium consisting of parts, or of certain devices and/or a combination of devices. The program may be uploaded to, and executed by, a machine comprising any suitable architecture. Preferably, the machine is implemented on a computer platform having hardware such as one or more central processing units ("CPUs") and/or controllers, and/or microprocessors, and other processing units, a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus configured to allow execution of a single physical copy of at least a portion of code by at least two processing units, comprising:
   a plurality of processing units including at least a first processing unit and a second processing unit;
   an instruction memory connected to the first processing unit and the second processing unit via a virtual address mapping, the instruction memory storing a single copy of the at least a portion of code to be executed by the first processing unit and the second processing unit, wherein the at least a portion of code to be executed has a first virtual address starting point for the first processing unit and a second virtual address starting point for the second processing unit, such that a span difference that is equal to a predetermined offset value times a factor value is maintained; and
   a data memory accessible by the plurality of processing units via the virtual address mapping, wherein the data memory stores at least a first data block to be used by the first processing unit and having a third virtual address starting point, and a second data block to be used by the second processing unit and having a fourth virtual address starting point, such that the span difference between the third virtual address starting point and the fourth virtual address starting point is maintained;
   wherein at least a data access by the at least a portion of code to any of the first data block and the second data block is performed as a program counter relative memory access mode combined with a data offset, thereby allowing a single instantiation of the single physical copy of the at least a portion of code by at least the first processing unit and the second processing unit while maintaining separate data block accesses.

2. The apparatus of claim 1, wherein the processing unit is any one of: a central processing unit (CPU), a controller, a multi-core CPU, a core of a multi-core CPU, a microcontroller, and virtual instantiations thereof.

3. The apparatus of claim 1, wherein the apparatus enables the execution of any one of: a virtual machine operating system and a para-virtualized operating system.

4. The apparatus of claim 1, wherein the factor is an integer value.

5. The apparatus of claim 4, wherein the span difference for the first virtual address and the second virtual address having a corresponding first factor and a second factor and wherein the second factor has an integer value larger by one than the first factor being equal to the predetermined offset value.

6. The apparatus of claim 1, wherein the first processing unit and the second processing unit are communicatively connected by at least one of: a serial interface, a bus, and a network.

7. The apparatus of claim 1, wherein the predetermined offset is equal to an integer multiplication of a memory page size used by the apparatus for memory management.

8. A method for executing a single physical copy of at least a portion of code executed independently by a first processing unit and a second processing unit, comprising:
   determining an offset value that is at least equal to a size of the at least a portion of code;
   generating memory mappings of the at least a portion of code having different virtual addresses for the first processing unit and the second processing unit set apart by the offset value to a single physical copy of the at least a portion of code; and
   generating memory mappings of at least portions of a first data block and a second data block respective of the first processing unit and the second processing unit, wherein the memory mappings are set apart by the offset value,
   wherein each of the first processing unit and the second processing unit uses its respective program counter value plus the offset value to access their respective first data block and second data block mapped by the memory mappings, thereby allowing a single instantiation of the single physical copy of the at least a portion of code by at least the first processing unit and the second processing unit while maintaining separate data block accesses.

9. The method of claim 8, wherein the offset value is equal to an integer multiplication of a memory page size used for memory management.

10. The method of claim 8, wherein the method is performed under any one of a virtual machine operating system and a para-virtualized operating system.

11. A non-transitory computer readable medium having stored thereon instructions for causing one or more processing units to execute the method according to claim 8.

12. A processing unit, comprising:
   a first processing element;
   an instruction memory connected to the processing element, the instruction memory stores at least a portion of code to be executed by the first processing element and at least a second processing element of a second processing unit, the at least a portion of code having the same physical address for the first processing element and a second processing element, wherein the first processing element and the second processing element have respective virtual addresses for the at least a portion of code that map to the same physical address and are set apart at a predetermined offset value;
   an interface to a data memory, the data memory includes a first data block and a second data block, the first data block is accessible by the first processing element and the second data block is accessible by the at least second processing element, each processing element having virtual memory addresses of at least a portion of data being set apart by the offset value and are mapped to mutually exclusive physical data blocks, wherein a data access of the at least a portion of code to the first data block and the second data block is performed as a program counter relative to access combined with a data offset value, thereby allowing a single instantiation of the single physical copy of the at least a portion of code by at least the first processing element and the second processing element while maintaining separate data block accesses.

13. The processing unit of claim 12, wherein the processing element comprises any one of: a central processing unit (CPU), a controller, a multi-core CPU, a core of a multi-core CPU, a microcontroller, and virtual instantiations thereof.

14. The processing unit of claim 12, wherein the processing element is configured to operate any one of: a virtual machine operating system and a para-virtualized operating system.

15. The processing unit of claim 12, wherein the offset value is an integer multiplication of a memory page size used for memory management.

16. The processing unit of claim 12, wherein the processing unit and the at least second processing unit are communicatively coupled by at least one of: a serial interface, a bus, a network.

* * * * *